United States Patent [19]

Fioramonti

[11] Patent Number: 5,114,346

[45] Date of Patent: May 19, 1992

[54] TEACHING MEANS

[76] Inventor: Michael J. Fioramonti, 103 Grant Ave., E. Rockaway, N.Y. 11518

[21] Appl. No.: 565,147

[22] Filed: Aug. 10, 1990

[51] Int. Cl.⁵ .............................................. G09B 17/00
[52] U.S. Cl. ..................................... 434/184; 434/170; 434/207
[58] Field of Search ............... 434/184, 156, 167, 168, 434/170, 171, 172, 176, 193, 207, 159

[56] References Cited

U.S. PATENT DOCUMENTS

| | | | |
|---|---|---|---|
| 557,182 | 3/1896 | Dell | 434/172 |
| 1,327,775 | 1/1920 | Platt | 434/172 |
| 1,864,703 | 6/1932 | West | 434/159 |
| 2,723,465 | 11/1955 | Silverstein | 434/184 X |
| 3,170,247 | 2/1965 | Kovacevich | 434/184 X |
| 3,704,338 | 11/1972 | Shore | 434/172 |
| 3,774,319 | 11/1973 | Sprowls | 434/164 |
| 4,090,311 | 5/1978 | Lyons | 434/184 |
| 4,299,577 | 11/1981 | Marryman | 434/170 |
| 4,379,699 | 4/1983 | Nelson | 434/184 |

FOREIGN PATENT DOCUMENTS 175049  5/1935  Switzerland ........................ 434/193

*Primary Examiner*—Richard J. Apley
*Assistant Examiner*—Karen Richard
*Attorney, Agent, or Firm*—Bernard J. Murphy

[57] ABSTRACT

The invention comprises three-dimensional characters, i.e., letters and/or numerals, which have discretely colored indicia thereon to distinguish left-hand and right-hand sides of the characters, so that a student of writing and/or reading will know how to position each character to dispose the same in a correct orientation. In this, one colored indicia must always be at the left-hand side, and the other colored indicia must always be at the right-hand side. Included is a color-coded guide in which, slidably, to set the characters; the coloring of the guide complements the left- and right-hand colored indicia of the characters.

6 Claims, 1 Drawing Sheet

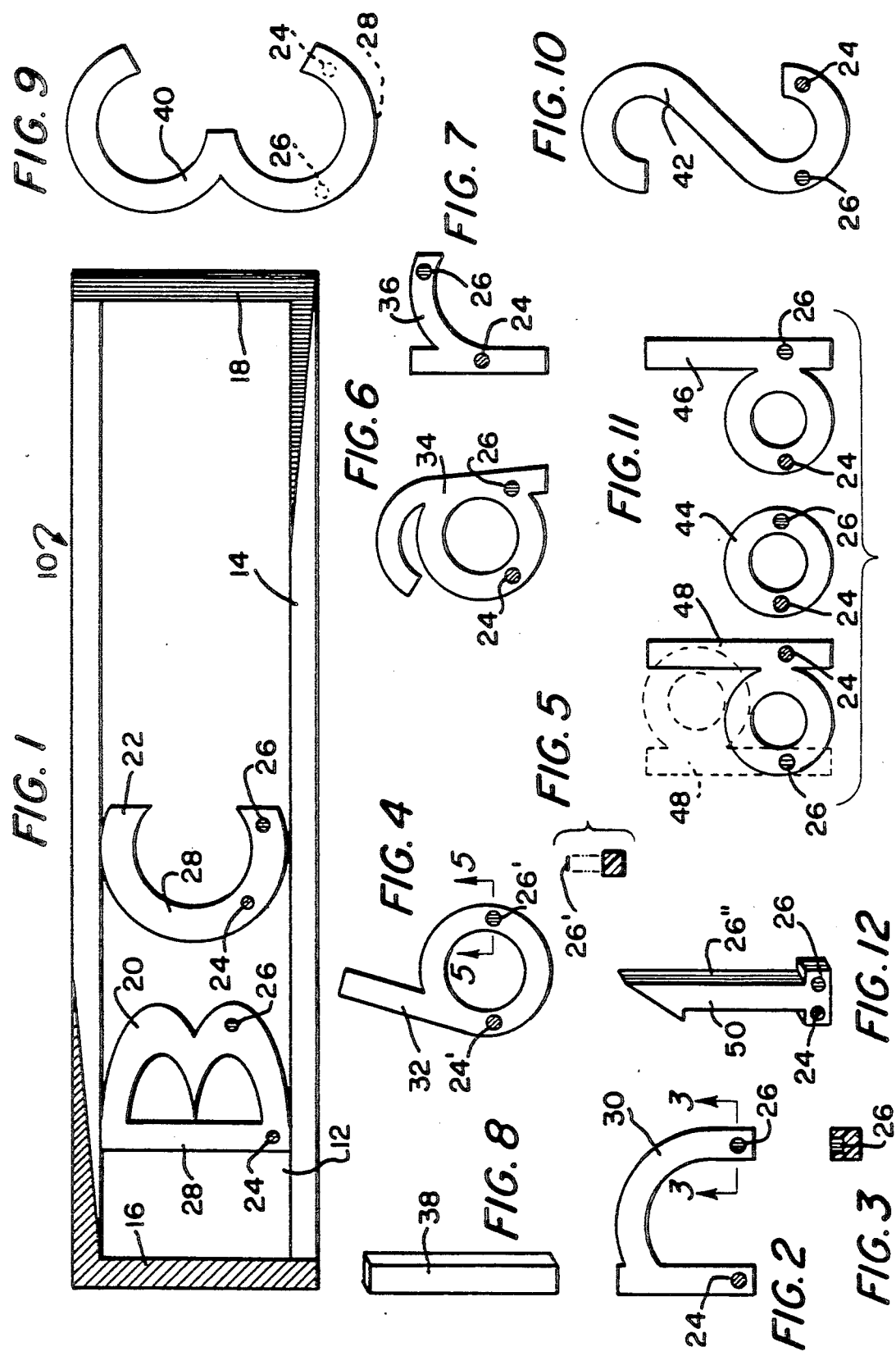

TEACHING MEANS

This invention pertains to devices useful for teaching reading and writing, and especially to such devices for helping persons having learning disabilities, dyslexia, and in particular to a teaching means which employs colors in a novel manner.

Devices of the type to which the invention pertains are well known in the prior art. Typical thereof are U.S. Pat. No. 2,723,465 issued to E. Silverstein on Nov. 15, 1955, for Testing and Training Device for Teaching Reading and Writing; U.S. Pat. No. 2,277,329, granted to C. S. Kimbrough, on Mar. 24, 1942, for an Educational Device; the Method of and Means for Improved Reading Efficiency of Persons with Specific Dyslexia, of U.S. Pat. No. 4,379,699, issued to Eileen M. Nelson, on 12 April 1983; U.S. Pat. No. 4,090,311, granted on May 23, 1978, to Dorothy F. Lyons, for a Method and Apparatus for Teaching Dyslexic Children; and the Instructional Reading Material of U.S. Pat. No. 3,170,247, issued to J. P. Kovacevich, on Feb. 23 1965.

Children and adults, who are learning to read and write, and especially those who are afflicted with learning disabilities, or dyslexia, easily become confused and will write letters and/or numerals upside down, or reversed. In order to teach such children and adults what is a correct orientation of letters and numbers, some of the prior art employs colors. By way of example, the cited Silverstein patent, 2,723,465, teaches a color matching scheme, and a discretely-grooved board in which, properly, to nest three dimensional characters. However, a character "n" may present the proper color, on the face thereof, but be inverted, in error, to represent a "u", or a given "h" could be erroneously inverted to appear as a "y".

What has been needed is a teaching means which will unmistakably distinguish between left hand and right hand sides of any discrete, three dimensional character, so that the student, the learning child or adult, will know, immediately, whether or not the character is correctly oriented by the use of colored indicia carried by each character.

It is an object of this invention to set forth just such a long-sought teaching means.

It is particularly an object of this invention to set forth a teaching means, comprising three dimensional characters, such as letters and ciphers; and means, borne by said characters, for indicating a correct orientation of said characters by distinguishing between left hand and right hand sides thereof.

Further objects of this invention, as well as the novel features thereof, will become more apparent by reference to the following description, taken in conjunction with the accompanying figures in which:

FIG. 1 is a plan view of two of the novel characters in a rectangular guide, according to an embodiment of the invention;

FIGS. 2 through 7 are depictions of differing characters, according to the invention, FIGS. 3 and 5 being cross-sectional views taken along sections 3—3 and 5—5 of FIGS. 2 and 4;

FIG. 8 is a perspective view of a character which, due to its configuration, neither has nor needs orientation-indicating means;

FIG. 9 is a view of a character, i.e., the numeral "3", shown in reversed, improper orientation;

FIG. 10 is a view of another character, i.e., the letter "S", shown in reversed, improper orientation;

FIG. 11 depicts a collection of characters, according to the invention, purporting to spell a word; and FIG. 12 is simply a perspective view of the character "1" showing its orientation-indicating means.

As shown in the figures, the invention 10, according to an embodiment thereof, comprises a rectangular guide 12 having a wall 14 about the perimeter thereof. The left-hand end 16 and a portion of the upper left is colored green, the same being indicated by the uniform lines which run diagonally from upper right to lower left. Also, the right-hand end 18 and a portion of the bottom right is colored red, the same being indicated by the uniform lines which run diagonally from the lower right to the upper left.

These colors, green and red, are chosen for a particular reason. Children and adults easily recognize the color green as indicative of "go" or "start" and recognize the color red as indicative of 'stop' or 'end'. Now, trading on this ready recognition of the colors green and red, the student/learner will be told that each of the characters which he or she is given to handle must have a green, starting-side to the left, and a red, ending side to the right; this conforms with the green left and red right of the guide 12. Too, upon characters being set into the guide 12, each will have a color-indicium thereon to show how to orient the same within the guide 12.

Referring particularly to FIG. 1, it will be seen that two, three dimensional characters 20 and 22, representing letters "B" and "C", respectively, have green indicium 24 and red indicium 26 thereon. The characters 20 and 22 have substantially planar surfaces 28, and the indicia 24 and 26 are carried on the surfaces 28. In one embodiment of the invention, the indicia 24 and 26 comprise dowel-like inserts, as shown in FIG. 3. In an alternative embodiment of the invention the indicia 24' and 26' are colored, adhesive backed, circular labels; these are shown in FIGS. 4 and 5. An indicia label 26' is shown exploded from its character, in FIG. 5.

The characters 30, 32, 34 and 36, of FIGS. 2, 4, 6 and 7, respectively, the same representing "n", "6", "a", and "r" are properly oriented. This is evidenced by the green indicia 24 shown to the left of each, and the red indicia 26 shown to the right of each. If any one of them were to be turned upside down, the student/learner would know immediately that such a disposition is in error, as the green indicia would be to the right, and the red indicia would be to the left. Too, if any one of them would be turned over — front-to-back — there'd be no indicia; this too would inform the student of the error.

FIG. 8 shows a character 38 which needs no indicia, as it is proper in an inverted disposition, and also in a turned-over disposition. In whatever context it would be used, the character 38 could be a numeral "one", the letter "1", or a lower part of a lower case "i". Where a letter or numeral has a discrete configuration, then the indicia 26 and 26 (or 24' and 26') are required. FIGS. 9 and 10 show characters which are disoriented. FIG. 9 depicts the numeral "3" reversed. Consequently, on the surface thereof, which arises from the drawing page, there's no indicia; on the underlying surface 28 are the indicia 24 and 26. The student will appreciate that, by turning the character 40 of FIG. 9 over, the green indicium 24 will be to the left, and the red indicium 26 will be to the right and, hence, the "3" will be correctly set.

FIG. 10 shows a disoriented, reversed "S", with indicia 24 and 26 thereon. This is an alternative embodiment of the invention in which, optionally, a character 42 can have indicia on the wrong side thereof which bears witness to the fact that it is the wrong side. The student looking at the character 42 of FIG. 10 will see that the green indicium 24 is on the wrong side, and so too is the indicium 26. In this practice, the inserts 24 and 26 could be of the thickness of the character 42, so that the colors thereof, green and red, respectively, would be visible on both sides of the character. The student, then, would see that to get the green indicium to the left, and the red indicium to the right, he or she has only to turn the character 42 over.

FIG. 11 represents an attempt of a student to spell a word which, for example, is "pod". The representation has the characters 44 and 46 properly oriented, with the green indicia 24 to the left, and the red indicia to the right. But, the student has the character 48 disoriented. The resultant spelling is of "dod". Even if dyslexic, the student will observe that the green indicium 24 for the character 48, like the red indicium 26, is on the wrong side. Now, if the student turns the character over, i.e., front-to-back, there'll be no indicia shown; so, this will instruct the student that that orientation is wrong also. However, if the student turns the character upside down, this will dispose the green and red indicia 24 and 26 on the proper sides, i.e., left-hand and right-hand, and will produce the word "pod".

FIG. 12 depicts a very slim character 50, representative of the numeral "1". Clearly, to employ indicia 24 and 26 on so limited an area requires some restrictions. The indicia has to be large enough to be discerned and, as a consequence, the three-dimensional characters 50, et al, have to present adequate area for either the inserts 24 and 26 or the labels 24' and 26'. If this will not be possible, in all circumstances, then an alternative practice of the invention can be pursued by coloring one side of the characters red or green; this is shown in FIG. 12 where the right hand side of the character 50 is colored red with indicia 26'' representative thereof. Thus, if every character were to be colored green on the left side, or red on the right side, or both, the student/learner would know how to orient the characters quite as well as if they had the indicia 24, 26, 24' and 26'.

While I have described my invention in connection with specific embodiments thereof it is to be clearly understood that this is done only by way of example, and not as a limitation to the scope of my invention as set forth in the objects thereof and in the appended claims. For example only, I depict the invention with the use of English letters and Arabic numerals. But, clearly other "writings" could be employed just as well. Too, the illustrations suggest that always the progression will be from left ("green") to right ("red"). This is not necessarily the case; in other uses of the invention, as in the teaching of Hebrew, for instance, the progression would be from the right to the left and, consequently, the guide 12 would have the green at the right-hand end 18, and the red at the left-hand end 16; too, the characters would be correspondingly color-coded to complement the Hebrew lettering.

Materials from which the characters are made are substantially unlimited. That is, they can be made of plastic, wood, paper, metal, rubber, Velcro, or of magnetized substances. Too, the sizes thereof are not relevant; very large characters would find use in a classroom setting, whereas smaller characters would be more facile for personal tutoring or parental use.

Such, and all other modifications and alterations of the invention, are deemed to be within the ambit of my teaching and embraced by the following claims.

I claim:

1. Means for teaching learning-disabled or dyslexic persons to grasp the concept of properly orientated letters and ciphers, comprising:

three-dimensional characters; and means, borne by said characters, for indicating a correct orientation of said characters by distinguishing between left-hand and right-hand sides thereof; wherein said characters have a substantially planar surface; and said orientation-indicating means comprises discretely color-coded indicia borne on said surface in laterally opposite areas thereof.

2. A teaching means, according to claim 1, wherein:

said indicia comprises colored, adhesive-backed, circular labels.

3. A teaching means, according to claim 1, wherein:

said indicia comprises colored, dowel-like inserts.

4. A teaching means, according to claim 1, further including:

a guide to slidably receive said characters.

5. Means for teaching learning-disabled or dyslexic persons to grasp the concept of properly orientated letters and ciphers, comprising:

three-dimensional characters; and means, borne by said characters, for indicating a correct orientation of said characters by distinguishing between left-hand and right-hand sides thereof; and further including a guide to slidably receive said characters; wherein said guide has opposite ends; and said ends has discretely color-coded.

6. A teaching means, according to claim 5, wherein:

said characters have a substantially planar surface;

said orientation-indicating means comprises indicia borne on said surface in separate, lateral areas thereof;

said indicia have discrete colors; and said colors are the same as those of said color-coded ends of said guide.

* * * * *